March 19, 1940. R. M. BOWIE 2,194,418
METHOD OF MAKING A CATHODE-RAY TUBE ENVELOPE
Filed Sept. 4, 1936
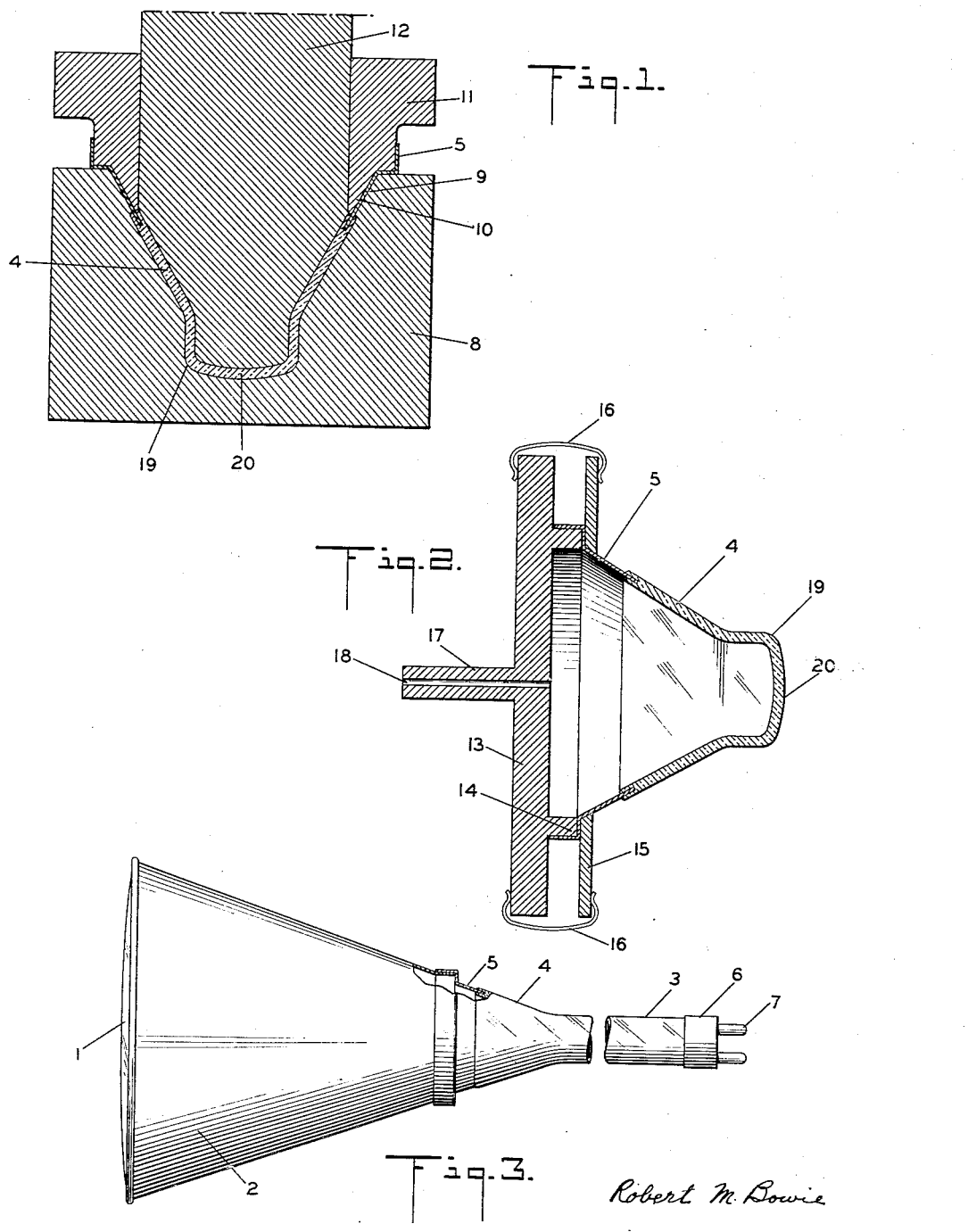
Robert M. Bowie
INVENTOR
BY John J. Rogan
ATTORNEY Patented Mar. 19, 1940

2,194,418

UNITED STATES PATENT OFFICE 2,194,418

METHOD OF MAKING A CATHODE-RAY TUBE ENVELOPE

Robert M. Bowie, Emporium, Pa., assignor to Hygrade Sylvania Corporation, Salem, Mass., a corporation of Massachusetts Application September 4, 1936, Serial No. 99,384

2 Claims. (Cl. 250—27.5)

This invention relates to cathode-ray tubes and more particularly to cathode-ray tubes of the composite metal-glass type.

An object of the invention is to provide an improved method of making a cathode-ray tube of the type having a composite metal-glass flare portion.

In cathode-ray tubes of the type wherein the main body portion of the envelope is of metal, it is not advisable to locate the usual deflecting plates in the vicinity of the metal part of the tube, particularly where the deflection is to be effected electromagnetically, because of the possible energy loss in the said metal part. However by constructing the neck portion of the envelope of glass or other vitreous material, it is possible to build a highly efficient and accurately controllable cathode ray tube, wherein the main body portion is of metal. However since the deflecting plates are usually located in the flared end of the neck portion, it is requisite that this flared portion be of comparatively large diameter, especially in the larger tubes where even the reduced end of the metal part of the envelope may be of the order of several inches in diameter. While the reduced end of the metal part of the envelope can, by ordinary methods, be made to very accurate dimensions, the same is not true of the manufacture of the co-operating flared end of the glass neck portion. While methods of flaring a glass tube to a relatively large diameter are well-known, I have found that these methods are not suitable for use in forming the flared portion of the tube neck. Furthermore these usual methods of flaring a glass tube to large diameters, are slow and highly accurate dimensions cannot be produced with sufficient uniformity and reliability to warrant their use in quantity production of large cathode-ray tube.

Accordingly it is a principal feature of the present invention to provide a method of making a composite metal-glass cathode-ray tube envelope, which is suited to quantity production, and wherein the flared neck portion of the tube can be made with a very high degree of accuracy and uniformity.

Another feature relates to the novel organization, and succession of steps which constitute an improved method of manufacturing a composite metal-glass cathode-ray tube envelope.

Other features and advantages not specifically enumerated will be apparent after a consideration of the following detailed descriptions and the appended claims.

In the drawing, Fig. 1 is a schematic sectional view of a device to explain the method of forming certain parts of a cathode-ray tube envelope according to the invention.

Fig. 2 is a sectional view to illustrate another step in the formation of the cathode-ray tube envelope.

Fig. 3 is a view of the completed cathode-ray tube made in accordance with the invention.

Referring more particularly to Fig. 3, the cathode-ray tube envelope is of the composite metal-glass type and comprises a substantially flat end wall 1 of glass or similar vitreous material having its interior face coated with suitable fluorescent material (not shown). The envelope comprises an elongated conical portion 2 of steel or other suitable metal. The neck portion of the envelope comprises a substantially cylindrical glass tubular portion 3 terminating at its left-hand end in an enlarged flare 4. Inasmuch as it is not practical to form a vacuum-tight seal between the metal 2 and the glass 3, there is interposed a frusto-conical ring 5 of a metal which has the same coefficient of expansion as the glass 4. Preferably the flare 4 is of Corning 705 AJ glass, and the ring 5 is of "Kovar" an alloy consisting of approximately 18% cobalt, 28% nickel and 54% iron. After the parts 1 to 5 have been assembled as described hereinbelow, the envelope has mounted therein the usual electrode assembly, and the tube is then exhausted and processed according to known procedure. After the tube has been processed and sealed-off, it may have fastened thereto a contact base 6 with appropriate contact prongs 7.

As will be seen from the foregoing description, the metal portions 2 and 5 are of rigid metal and in order to effect a proper vacuum-tight seal between members 4 and 5 it is necessary that the mouth of the flare 4, be of accurate diameter. I have found that the ordinary methods of flaring a glass tube and uniting it to a metal ring are not suitable for use in cathode-ray tubes of the type described, either because of the time required to effect the proper seal, or because of the lack of reliability or uniformity in the seal. I have also found that by employing a special pressure molding operation it is possible to overcome the above-noted disadvantages, and as a result relatively large composite metal-glass cathode-ray tube envelopes can be made comparatively economically and with accurate dimensions.

Referring to Fig. 1 a description will now be given of the manner of simultaneously forming the flare 4 and sealing it in a vacuum-tight manner to ring 5. In Fig. 1 the numeral 8 represents schematically a suitable mold having a frusto-conical mold cavity terminating at its bottom in a reduced cylindrical cavity. The mouth of the conical cavity is provided with a raised rim 9 for the purposes about to be described. The metal ring 5 is seated on the rim of the mold as shown, so that the lower edge of the frusto-conical portion 10 extends into the mold cavity beyond the rim 9 thus providing a slight clearance between the said edge and the face of the mold cavity. The clamping ring 11 is placed in position to hold the ring 5 rigidly in place. A "gather" or ball of molten glass preferably at white heat is then allowed to fall into the mold cavity and immediately thereafter the plunger 12 is lowered to force the liquid glass upward until it engages the edge of ring 5 and flows therearound as shown. It will be noted that the head of the plunger 12 is shaped complementary to the mold cavity so that when said plunger is in its lowermost position the molten or liquid glass assumes a frusto-conical shape terminating in a cylindrical cup at its lower end as shown in section in Fig. 1. Preferably the "gather" is heated prior to being dropped into the mold to such a temperature, and preferably the "gather" is of such a mass that when it contacts with the edge of ring 5 it raises the latter to a sufficiently high temperature at which the oxide on the said edge dissolves in the molten glass, it being understood that the said edge has been previously oxidized in any well-known manner. There is thus formed a composite metal-glass assembly consisting of an accurately dimensioned frusto-conical glass part sealed in a vacuum-tight manner to the Kovar ring 5.

After the composite metal-glass assembly has cooled sufficiently in the mold, whereupon it may be removed and annealed in any well-known manner. The annealed assembly is mounted in a suitable air-tight jig such for example as shown in Fig. 2 comprising a rotatable head 14 and a clamping ring 15, adapted to be held in place by suitable springs 16. The hub 17 is provided with a passage-way 18 leading to a blowing hose for purposes to be described. With the assembly as shown in Fig. 2 set in rotation, the glass blower then heats the end 20 to soften it, and at the proper instant he blows through passage 18 to blow the end 20 to a bubble which can then be broken off. By means of a carbon rod or paddle the edge 19 is straightened and smoothed to the proper diameter, while the said part 19 is still within the softening flame. A suitable length of glass tubing 3 is then placed in axial alignment with the end 19 and the two are sealed together in the manner well-known in the glass blowing art.

When the joining of the cylindrical glass neck portion 3 has been completed, the clamp 15 is removed and the assembly comprising elements 3, 4 and 5 is united to the metal member 2. Preferably the rim of ring 5 is welded to the reduced end of member 2 to form a vacuum-tight seal therewith. The finished composite metal-glass envelope is then ready to receive the electrode assembly or mount.

It will be understood of course that the glass end 1 may be sealed to the metal member 2 either before or after the union of parts 2 and 5 as above-described. Likewise the parts 2 and 5 may be welded together as a unit prior to sealing thereto the glass flare as above-described. In this latter case the mold will be provided with a suitable clamping member to hold the parts rigidly in place during the pressure on the glass "gather" in the mold as described.

Other modifications may be made in the method described, without departing from the spirit and scope of the invention.

What I claim is:

1. The method of manufacturing a cathode-ray tube envelope of the type having a main funnel-shaped body portion of metal which comprises, sealing, a metal ring in a pressure molding die into the flared end of a glass member having a cylindrical portion terminating at one end in a flare and closed off at the other end by a transverse wall, heating said wall to soften it, blowing air through said member to form said wall into a bubble, breaking off said bubble, sealing an elongated glass tube to the rim of said cylindrical portion of said glass member, and welding said metal ring to the constricted end of said funnel-shaped body portion.

2. The method of manufacturing a cathode-ray tube envelope of the type having a main enlarged body portion of metal which comprises, sealing a metal ring in a pressure molding die into the flared end of a glass member having a cylindrical portion closed at one end by a wall, subsequently removing said closing wall, sealing an elongated glass tube to the rim of said cylindrical portion of said glass member, and welding said metal ring to said main body portion so that said main body portion, said ring, and said glass member form a continuous tubular structure with the parts joined in a vacuum-tight manner.

ROBERT M. BOWIE.